(No Model.)

G. M. KILMON.
TRACTION WHEEL FOR HARVESTERS.

No. 584,369. Patented June 15, 1897.

WITNESSES:
J. C. Shaw
Chas. S. Brock

INVENTOR
G. M. Kilmon,
BY
Marat Co
ATTORNEYS.

UNITED STATES PATENT OFFICE.

GEORGE M. KILMON, OF ROYAL OAK, MARYLAND, ASSIGNOR OF ONE-HALF TO GEORGE L. CALDWELL, OF BALTIMORE, MARYLAND.

TRACTION-WHEEL FOR HARVESTERS.

SPECIFICATION forming part of Letters Patent No. 584,369, dated June 15, 1897.

Application filed October 3, 1896. Serial No. 607,746. (No model.)

*To all whom it may concern:*

Be it known that I, GEORGE M. KILMON, residing at Royal Oak, in the county of Talbot and State of Maryland, have invented a new and Improved Traction-Wheel for Harvesters, &c., of which the following is a specification.

This invention relates generally to traction-wheels, and more especially to an improved construction of traction-wheels adapted for use upon harvester and similar machines.

The object of this invention is to provide a traction-wheel which will be exceedingly strong and durable, one that will be light and serviceable, and one that will yield to rocks and hard irregularities of surface, thereby preventing the machine from being severely jarred or the rim of the wheel from being broken.

With these various objects in view my invention consists, essentially, of a traction-wheel having an elastic or yielding tread or tire.

My invention consists also in a traction-wheel having an inner non-yielding rim and an outer elastic or yielding rim; and my invention consists, further, in making such yielding rim or tread in sections, each section being independent of the others.

My invention consists also in certain details of construction and novelties of combination, all of which will be fully described hereinafter, and pointed out in the claims.

Figure 1:
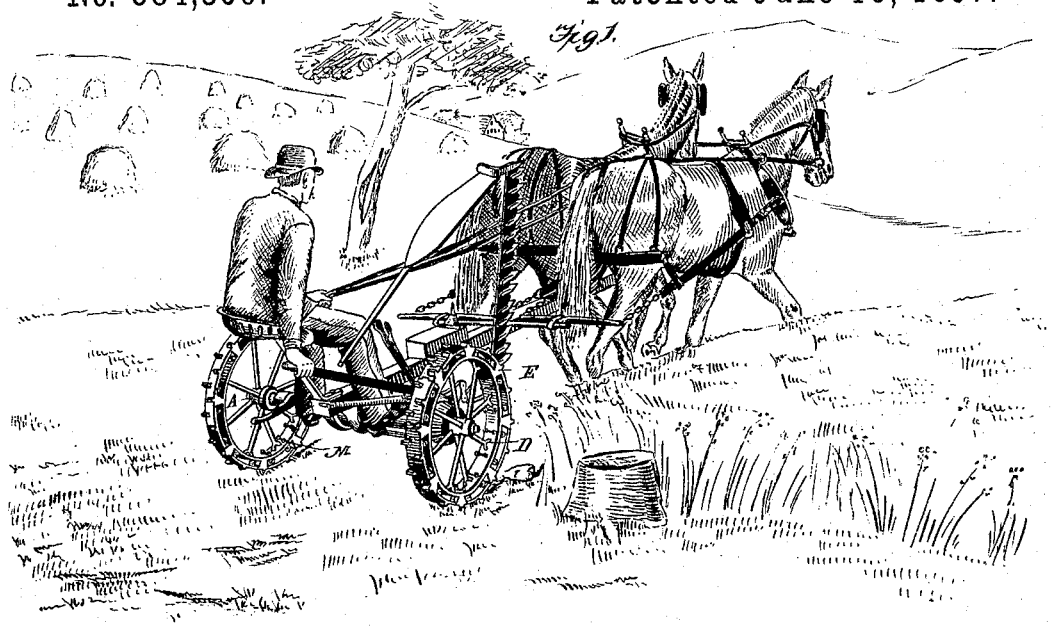
Figure 2:
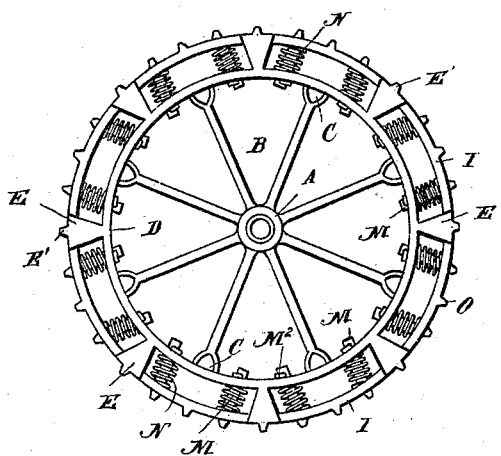
Figure 3:
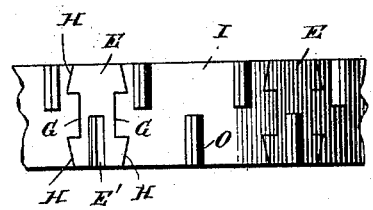
Figure 4:
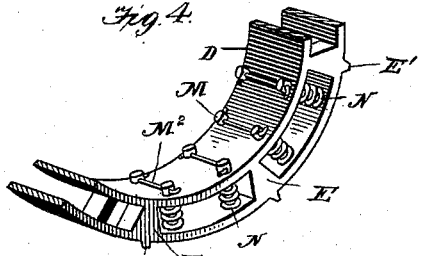
Figure 5:
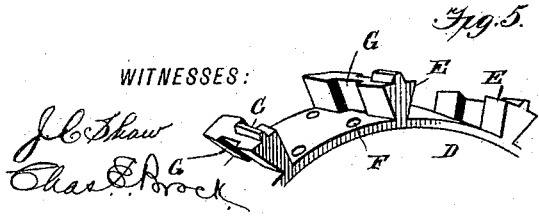

In the drawings forming a part of this specification, Figure 1 is a view showing an improved construction of a harvester or mower provided with my improved construction of traction-wheel. Fig. 2 is a side elevation of said wheel. Fig. 3 is a partial top plan view of the tread. Fig. 4 is a detail perspective view showing the manner of uniting the tread-section to the inner rim. Fig. 5 shows the detail of construction detached.

In carrying out my invention I construct the wheel with a hub A the same as usual, from which radiate spokes B, said spokes being preferably bifurcated at their outer ends, as shown at C, where they unite with the inner rim D; but this construction is not at all necessary, as this bifurcated feature may be dispensed with if desired. The inner rim D is preferably made of a single piece and is thoroughly rigid throughout, and at regular intervals said rim is provided with radial projections E upon the outer face thereof, said projections being essentially wedge-shaped and carrying traction-teeth E'. A series of perforations F are produced in the rim D between the projections E, said perforations being arranged in pairs, as clearly shown in Figs. 4 and 5. The opposite faces of the projections E have recesses or notches G cut therein, and the ends of said projections are tapered, as shown at H. (See Figs. 3 and 5.) Between each pair of projections E is arranged a section I of the outer rim or tread, said section having an extension K at each end, which fits in the recess G, and the ends are tapered, as shown at L, in order to engage the tapered portion H of the projection E. This construction of the tread-section enables it to fit snugly between the peculiarly-constructed projections of the inner end.

Each section I has a series of pins M projecting from the inner face, there being four such pins arranged in pairs, which pins are adapted to pass through the openings F, when the tread-section is arranged between the projections E, and at the end of each pin is produced a transverse opening M', through which is passed the locking-pin M², whereby the guide-pins M are securely locked against dislocation from the inner rim D, as most clearly shown in Fig. 4. Surrounding each guide-pin between the tread section or plate I and the rim D is a coiled spring N, the normal tendency of which is to maintain the tread section or plate I flush with the top of the projections E, thereby providing a uniform circular rim or tread, and it will be noticed that the tread section or plate is provided with traction-teeth O, thereby providing a thoroughly-efficient traction-wheel.

Now it will be understood that in operation the springs N are sufficiently strong to maintain the position of the tread-sections while traveling over ordinary ground; but should a rock or stump be met with the said springs will be compressed, permitting the tread-section to yield and thereby avoiding a severe jar to the machine and also preventing the periphery of the wheel from being broken.

Having thus described my invention, what I claim as new, and desire to secure by Letters Patent, is—

1. In a traction-wheel, the combination of the inner rim provided with a number of projections having a tread-surface, and a number of tread-sections yieldingly held between said projections and having their tread-face in the same plane of contour as the tread-surface of the projections, substantially as shown and described.

2. In a traction-wheel, the combination of the inner rim provided with projections having a tread-surface, said projections being grooved on their faces and having the ends thereof tapered, and a number of tread-sections yieldingly held between said projections and formed with extensions which fit in the grooves of the projections and having the tapered faces engaging the tapered faces of the projections, substantially as shown and described.

3. In a traction-wheel, the combination of the inner rigid rim provided with projections having a tread-surface, a series of sections having a tread-surface fitting between said sections, and means for yieldingly holding the said sections in position consisting of springs surrounding projecting pins on the tread-sections, located between the rigid rim and said sections, and said pins passing through openings formed in the rigid rim and prevented from being drawn out by means of pins which pass through openings in the projecting pins, substantially as shown and described.

4. An improved traction-wheel comprising an inner rim having radial projections, said radial projections being recessed or notched, the tread-sections having tongues or extensions adapted to engage said recesses or notches, the guide-pins carried by said tread-sections and passing through apertures in the rim, the lock-pins securing said guide-pins upon the inner side of the rims, and the springs surrounding said guide-pins between the rim and tread-section, substantially as shown and described.

GEORGE M. KILMON.

Witnesses:
T. C. SEYMOUR,
GEO. SMITH.